US012558807B1

(12) United States Patent
Sung

(10) Patent No.: US 12,558,807 B1
(45) Date of Patent: Feb. 24, 2026

(54) MULTI-FOLDING AXE

(71) Applicant: TOP QUEST INC., Chino, CA (US)

(72) Inventor: Shaoching Sung, Chino, CA (US)

(73) Assignee: Top Quest Inc., Chino, CA (US)

( * ) Notice: Subject to any disclaimer, the term of this patent is extended or adjusted under 35 U.S.C. 154(b) by 0 days.

(21) Appl. No.: 19/275,495

(22) Filed: Jul. 21, 2025

(51) Int. Cl.
*B26B 23/00* (2006.01)
*B25G 1/04* (2006.01)

(52) U.S. Cl.
CPC ................ *B26B 23/00* (2013.01); *B25G 1/04* (2013.01)

(58) Field of Classification Search
None
See application file for complete search history.

(56) References Cited

U.S. PATENT DOCUMENTS 2,989,100 A * 6/1961 Burdis .................... B26B 23/00 30/308.2
D961,355 S * 8/2022 Lin .................................. D8/81
2011/0016726 A1* 1/2011 Clarke .................... B27L 7/005 269/319
2014/0259695 A1* 9/2014 Guynn ..................... B25D 7/00 81/20
2023/0182337 A1* 6/2023 Huizinga ................ B26B 23/00 30/308.1

* cited by examiner

*Primary Examiner* — Hwei-Siu C Payer
(74) *Attorney, Agent, or Firm* — Heidi Eisenhut; LOZA & LOZA, LLP

(57) ABSTRACT

A multi-folding axe includes a head and a handle. The head has a blade at one end. The handle has a base and an extension. The extension is rotatably attached to the head at a first axis. The base is rotatably attached to the extension at a second axis parallel to the first axis. The handle is substantially perpendicular to the head with respect to the blade when unfolded. The extension is substantially in line with and extending away from the base when unfolded. The blade folds into the extension by rotating the head in one direction about the first axis with respect to the extension. The extension and folded blade fold into the base by rotating the extension and folded blade in the one direction about the second axis. The blade is sheathed and secured by the extension and base when folded into the extension and base.

20 Claims, 10 Drawing Sheets

REPLACEMENT SHEET

4/10

MULTI-FOLDING AXE

TECHNICAL FIELD

The present disclosure relates generally to a hardware implement, and more particularly, to a foldable axe.

BACKGROUND

An axe is a hand-operated bladed implement used to work with wood and timber, and also as a weapon. It includes a somewhat heavy head (e.g., metal or stone) having at least one bladed edge, together with a firmly attached handle. The handle is of sufficient length to allow the user to transfer significant momentum to the head by using the handle as a lever. This allows the bladed edge to contact a target surface with great force, such as to split wood, fell timber, or hit or neutralize a target. The axe can even be thrown to hit something more distant than the user. In serving these functions, an axe is often a large and dangerous implement.

There is a need for a foldable axe that presents a smaller safer implement when not deployed in its functional configuration.

SUMMARY

In an embodiment of the present disclosure, a folding axe is provided. The folding axe includes a head, an extension, and a base. The head has a blade and a butt opposite the blade in a width dimension when unfolded, and is rotatable about a first axis between the blade and the butt when transitioning between folded and unfolded. The first axis is in a thickness dimension. The extension has a shoulder, a bottom opposite the shoulder in a length dimension when unfolded, and a first channel between the shoulder and the bottom. The shoulder is attached to the head at the first axis. The bottom is rotatable about a second axis at the bottom when transitioning between folded and unfolded. The second axis is in the thickness dimension and parallel to the first axis. The first channel is configured to sheathe a portion of the blade when folded. The base has a top, a knob opposite the top in the length dimension when unfolded, and a second channel between the top and the knob. The top is attached to the extension at the second axis. The second channel is configured to sheathe a remainder of the blade, a portion of the first channel, and at least some of the butt when folded.

In an aspect, when unfolded, the head is fixedly attached and perpendicular to the extension at the first axis, and the base is fixedly attached to and in line with and extending away from the extension at the second axis. When folded, the head is fixedly attached to the extension at the first axis, the butt is substantially sheathed by the second channel, and the extension is fixedly attached to the base at the second axis.

In an aspect, the axe folds by: folding the head into the extension by rotating the head approximately 90° in a first direction about the first axis with respect to the extension to sheathe the portion of the blade in the first channel; and folding the extension and folded head into the base by rotating the extension and folded head approximately 180° in the first direction about the second axis with respect to the base to sheathe the remainder of the blade, the portion of the first channel, and the at least some of the butt in the second channel.

In a further aspect, the extension includes a first stop to prevent the head from rotating more than the approximately 90° in the first direction about the first axis with respect to the extension when folding the head into the extension. The base includes a second stop to secure the folded head to the extension and prevent the extension and folded head from rotating more than the approximately 180° in the first direction about the second axis with respect to the base when folding the extension and folded head into the base.

In a further aspect, the base includes: a first catch to engage the folded extension and prevent the extension from unfolding from the base by automatically fixedly attaching the folded extension to the base when folding the extension into the base; and a first release to allow the extension to unfold from the base by disengaging the first catch from the folded extension.

In a further aspect, the axe unfolds by: unfolding the extension and folded head from the base by rotating the extension and folded head the approximately 180° in a second direction opposite the first direction about the second axis with respect to the base to unsheathe the remainder of the blade, the portion of the first channel, and the at least some of the butt from the second channel; and unfolding the head from the extension by rotating the head the approximately 90° in the second direction about the first axis with respect to the extension to unsheathe the portion of the blade from the first channel.

In a still further aspect, the base includes a third stop to prevent the extension from rotating more than the approximately 180° in the second direction about the second axis with respect to the base when unfolding the extension from the base, and the extension includes a first stop to stop the head from rotating more than the approximately 90° in the second direction about the first axis with respect to the extension when unfolding the head from the extension.

In a still further aspect, the base includes a second catch to engage an unfolded extension and prevent the extension from folding into the base by automatically fixedly attaching the unfolded extension to the base when unfolding the extension from the base, and a second release to allow the extension to fold into the base by disengaging the second catch from the unfolded extension. The extension includes a third catch to engage the unfolded head and prevent the head from folding into the extension by automatically fixedly attaching the unfolded head to the extension when unfolding the head from the extension, and a third release to allow the head to fold into the extension by disengaging the third catch from the unfolded head.

In an aspect, the folding axe further includes a first pin that inserts through corresponding first holes in the head and the extension in the thickness dimension when unfolded to prevent rotation of the head about the first axis with respect to the extension, and a second pin that inserts through corresponding second holes in the extension and the base in the thickness dimension when unfolded to prevent rotation of the extension about the second axis with respect to the base.

In an aspect, the extension includes a first plate extending in the length and width dimensions when unfolded, and a second plate parallel to and having a same size as the first plate. The first and second plates define a size and shape of the extension and have insides that define the first channel therebetween. The base includes a third plate extending in the length and width dimensions when unfolded, and a fourth plate parallel to and having a same size as the third plate. The third and fourth plates define a size and shape of the base and have insides that define the second channel therebetween.

In a further aspect, the first and second plates are made of metal and have symmetric patterns of first openings to save weight and create first passthroughs in the thickness dimension when unfolded. The third and fourth plates are made of metal and have symmetric patterns of second openings to save weight and create second passthroughs in the thickness dimension when unfolded.

In a further aspect, the base further includes a first grip fixedly attached to an outside of the third plate and a second grip fixedly attached to an outside of the fourth plate. The first and second grips help protect and facilitate handling of the base.

In an aspect, the knob includes a hook shape to secure a hand when holding the axe by the base, the butt includes a chisel or pick opposite the blade in the width dimension when unfolded, the butt is sheathed by the second channel when folded; and the butt further includes a groove to facilitate rotating the head about the first axis with respect to the extension.

In another embodiment of the present disclosure, a multi-folding axe is provided. The multi-folding axe includes: a head having a blade at one end; an extension rotatably attached to the head at a first axis, and substantially perpendicular to the head with respect to the blade when unfolded; and a base rotatably attached to the extension at a second axis parallel to the first axis, and substantially in line with and extending away from the extension when unfolded. The blade folds into the extension by rotating the head in one direction about the first axis with respect to the extension. The extension and folded blade fold into the base by rotating the extension and folded blade in the one direction about the second axis. The blade is sheathed and secured by the extension and base when folded into the extension and base.

In an aspect of the multi-folding axe, the extension includes a first catch that prevents an unfolded blade from rotating about the first axis with respect to the extension by automatically engaging the head when the blade unfolds from the extension, and the base includes a second catch that prevents the unfolded extension from rotating about the second axis with respect to the base by automatically engaging the extension when the extension unfolds from the base.

In a further aspect of the multi-folding axe, the first catch includes a first leaf spring that releases tension to secure the head with respect to the extension when the blade unfolds from the extension, and the second catch includes a second leaf spring that releases tension to secure the extension with respect to the base when the extension unfolds from the base.

In a still further aspect of the multi-folding axe, the extension further includes a first release that restores the tension in the first leaf spring to allow the blade to fold into the extension, and the base further includes a second release that restores the tension in the second leaf spring to allow the extension and folded blade to fold into the base.

In a further aspect of the multi-folding axe, the axe further includes: a first pin that inserts through corresponding first holes in the head and the extension when unfolded to further prevent the unfolded blade from rotating about the first axis with respect to the extension; and a second pin that inserts through corresponding second holes in the extension and the base when unfolded to further prevent the unfolded extension from rotating about the second axis with respect to the base.

In a further aspect of the multi-folding axe, the base further includes a third catch that prevents the folded extension from rotating about the second axis with respect to the base by automatically engaging the extension when the extension folds into the base, the extension further includes a first stop that prevents the folded blade from rotating in the one direction about the first axis with respect to the extension, and the base further includes a second stop that prevents the folded blade from rotating in an opposite direction about the first axis with respect to the folded extension.

In yet another embodiment of the present disclosure, a foldable axe is provided. The foldable axe includes a foldable head having a blade at one end, and a foldable handle having a top section and a bottom section. The head securely attaches to the handle in a perpendicular orientation with respect to the blade when unfolded. When folding the axe, the head folds into the top section via a first pivot that rotatably connects the head to the top section, and the top section and folded head fold into the bottom section via a second pivot that rotatably connects the top section to the bottom section.

DETAILED DESCRIPTION

Figure 1:
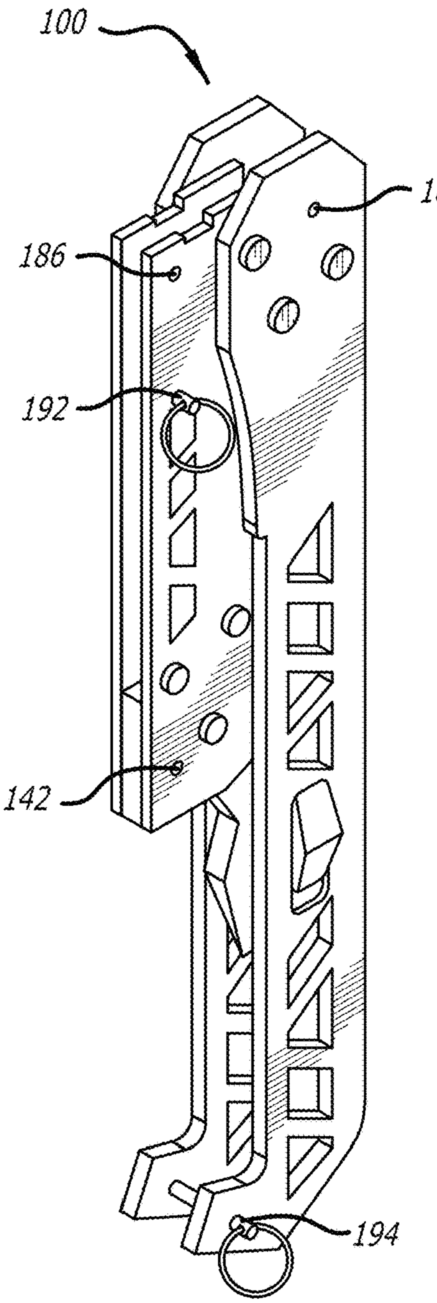
FIG. 1 illustrates an oblique view of an example multi-folding axe in a folded state, with a folded head and a folded handle, according to an embodiment.

In conjunction with the attached drawings, specific embodiments will now be described in detail to provide an understanding of various aspects of the disclosure to one of ordinary skill in the art. However, it will be understood by one of ordinary skill that these aspects may be practiced without these specific details. As used herein, the term "aspects" does not require that all embodiments of the disclosure include the discussed feature, advantage, or mode of operation.

The present disclosure provides embodiments of a multi-folding axe. In some embodiments, the axe head is completely foldable into the handle through a series of folding operations. This not only reduces the size of the axe, but improves safety of handling the axe by securely hiding the axe head (in particular, the blade) when folded.

As discussed above, in order to carry out its intended uses, an axe is often a large and dangerous implement. Accordingly, reducing its size or risks to those nearby when handling the axe would likely render the axe less capable of these intended uses.

Embodiments of the present disclosure address these concerns by providing a foldable axe capable of folding in multiple places. These folds not only sheathe the axe blade and other dangerous parts, but also reduce the size of the axe considerably for storage or transportation. This produces both size and safety benefits compared to non-folding axes while also providing a fully functional axe in the unfolded configuration. In an example embodiment, the foldable axe has a foldable head and a foldable handle. The head has a blade at one end. The handle has a top section and a bottom section, often referred to as an "extension" and a "base" throughout. The head securely attaches to the handle in a perpendicular orientation with respect to the blade when unfolded. When folding the axe, the head folds into the top section of the handle via a first pivot that rotatably connects the head to the top section. In addition, the top section and folded head fold into the bottom section of the handle via a second pivot that rotatably connects the top section to the bottom section.

FIGS. 1-15 illustrate various views of an example multi-folding axe 100 in folded, partially folded, and unfolded states, according to an embodiment. The axe 100 is also sometimes referred to as a folding axe 100 or a foldable axe 100. As used throughout when describing the axe 100, "unfolded" or "open" refers to the axe 100 in its normal configuration (i.e., able to carry out its intended tasks, see FIG. 13), with an unfolded head and an unfolded handle. By contrast when describing the axe 100, "folded" or "closed" refers to the axe 100 in its compact or travel configuration (i.e., smaller and safer to transport and handle, but unable to carry out its intended tasks, see FIG. 2), with a folded head and a folded handle. In addition, when describing the axe 100, "partially" folded or "partially" open or "partially" closed refers to the axe 100 in an in-between state (see FIG. 6), with a folded head and an unfolded handle.

In a similar fashion, when describing the blade, "unsheathed" refers to the blade when the axe 100 is unfolded. By contrast when describing the blade, "partially" sheathed or "partially" unsheathed refers to a partial sheathing of the blade by the handle when the axe 100 is partially folded. In addition, when describing the blade, "sheathed" refers to a complete sheathing of the blade by the handle when the axe 100 is folded. While the reference numerals and corresponding features are used and described consistently throughout, the present disclosure is not to be interpreted as being limited to these features. Rather, other embodiments variations are also described throughout, or would be apparent to one of ordinary skill in light of the disclosure.

Figure 13:
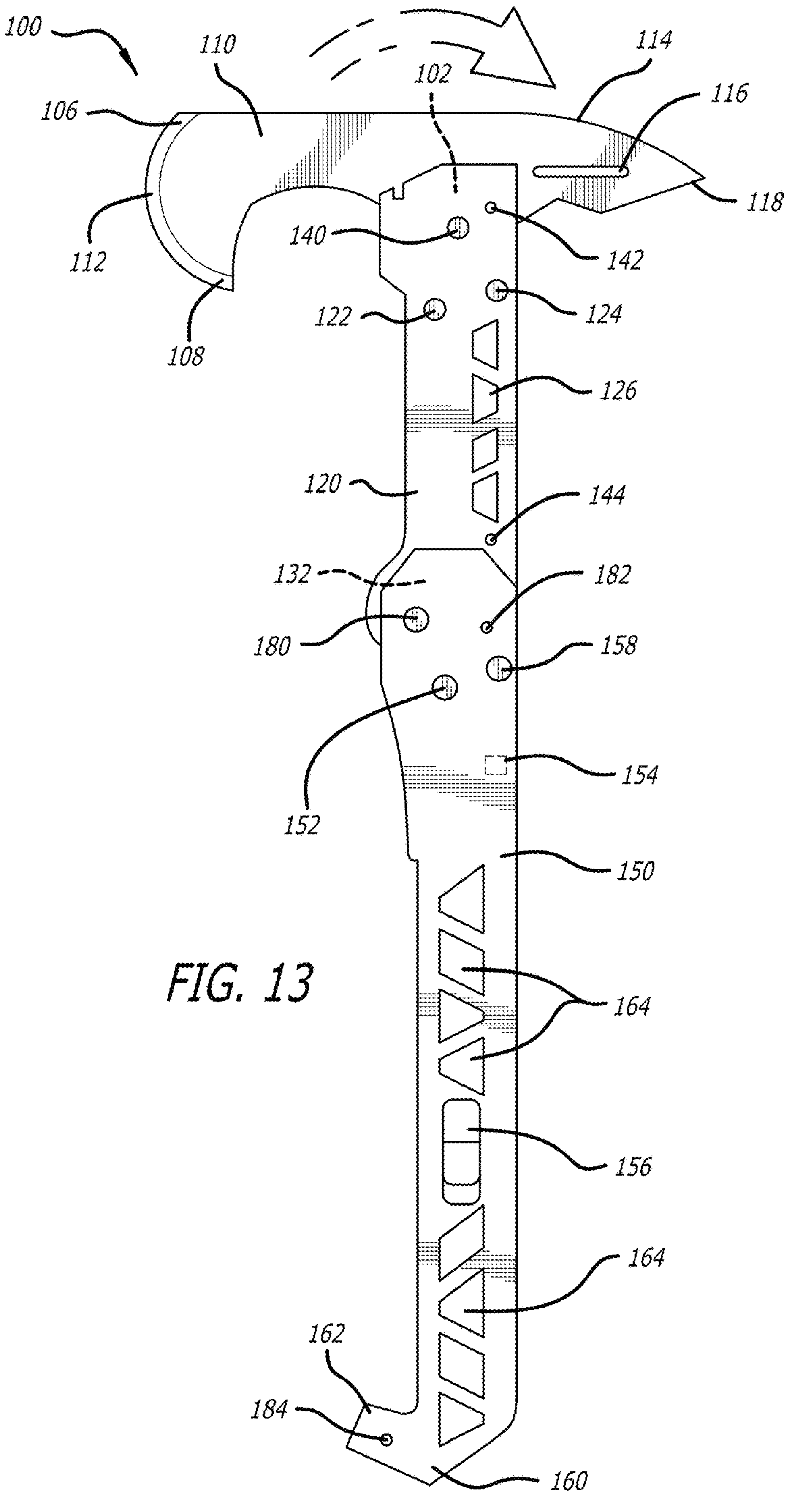
FIG. 13 illustrates a front view of the unfolding of the folded head of the multi-folding axe of FIG. 6, leaving the multi-folding axe in an unfolded state, with the unfolded head and the unfolded handle.

With reference primarily to FIG. 13 (and other drawings when specifically mentioned), the multi-folding axe (or axe) 100 in an unfolded or open configuration includes a head 110 having a blade 112 on one end, and a handle (including an extension 120 and a base 150) to which the head 110 is attached. The extension 120 is rotatably coupled or otherwise rotatably attached to the head 110 at a first pivot 140. The base 150 is rotatably coupled or otherwise rotatably attached to the extension 120 at a second pivot 180. The thickness of the head 110 is less than that of the extension 120 to allow the head 110 to fold (rotate about the first pivot 140) into the extension 120 while partially sheathing the blade 112 by the extension 120. In addition, the thickness of the extension 120 and folded head 110 is less than that of the base 150 to allow the extension 120 and folded head 110 to fold (rotate about the second pivot 180) into the base 150 while sheathing the remainder of the exposed blade 112 by the base 150. The size of the base 150 is appropriate for hand holding (i.e., fingers of intended users are able to reach around the base 150 near the knob 160 for a secure grip and to deliver maximum leverage to the head 110).

Figure 2:
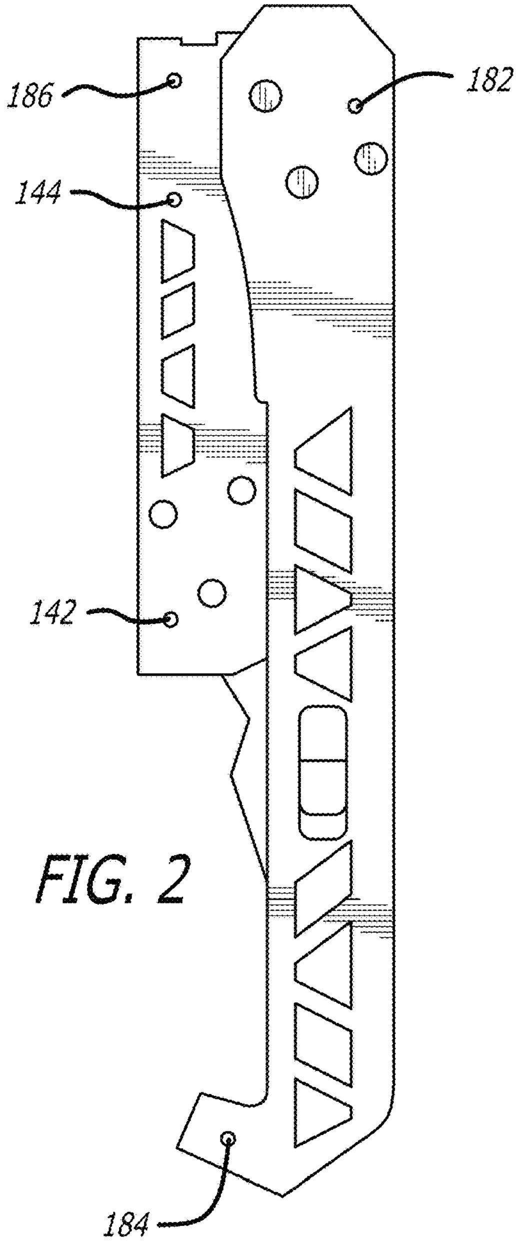
FIG. 2 illustrates a front view of the multi-folding axe of FIG. 1.
Figure 6:
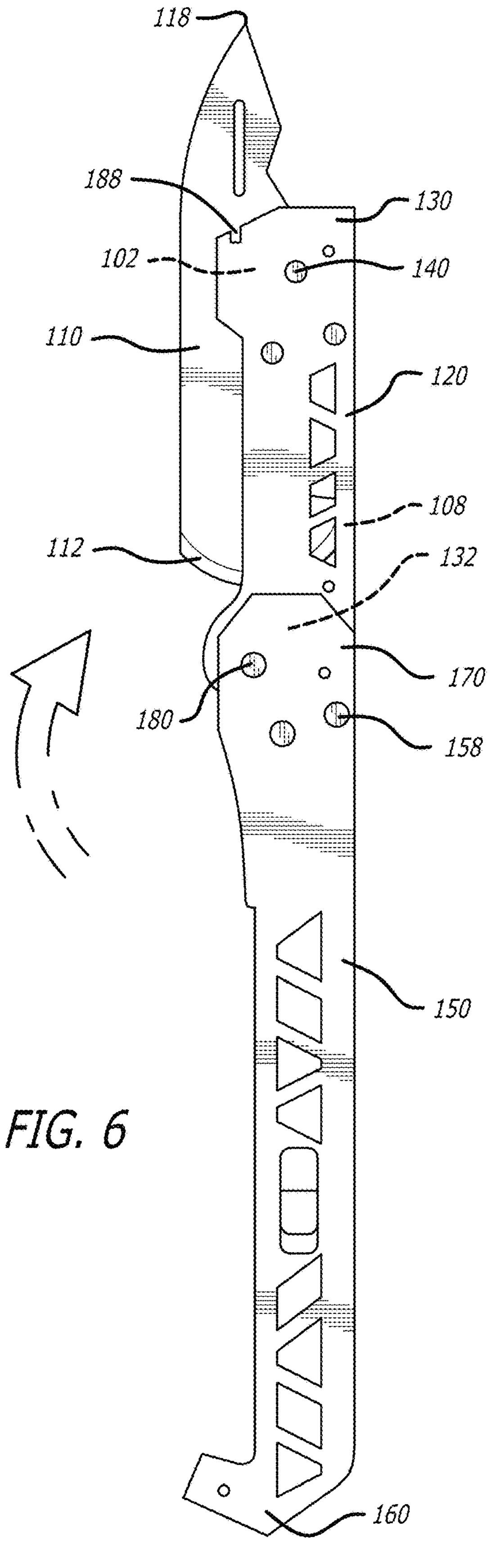
FIG. 6 illustrates a front view of an unfolding of the folded handle of the multi-folding axe of FIGS. 1-3, leaving the multi-folding axe in a partially folded state, with the folded head and an unfolded handle.
Figure 7:
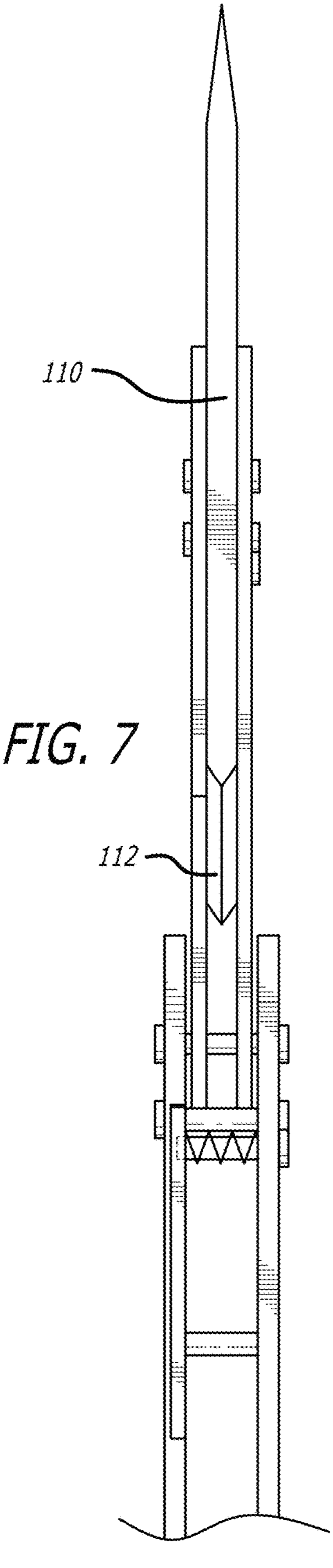
FIGS. 7-8 illustrate left side views of an operation of an automatic catch mechanism to secure the unfolded handle of the multi-folding axe of FIG. 6.
Figure 8:
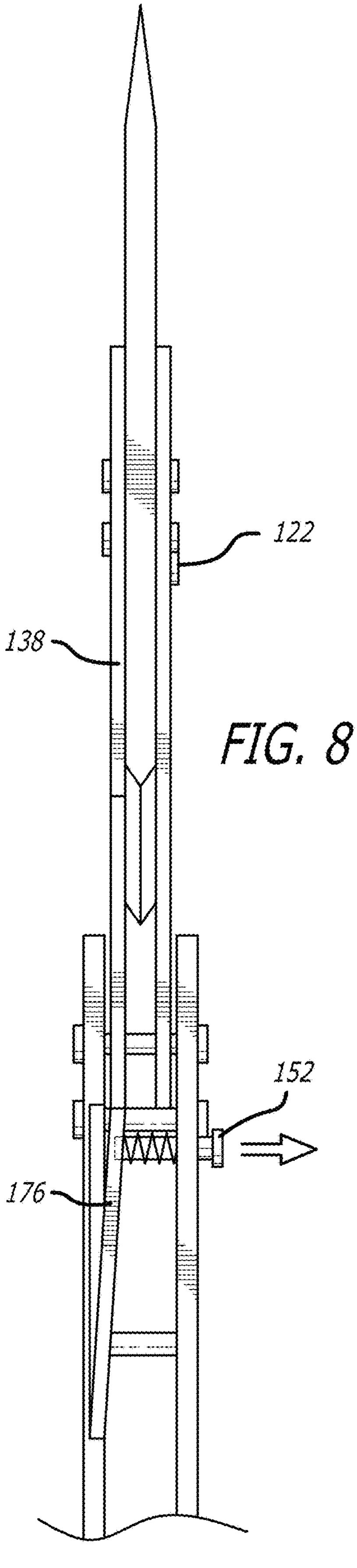
Figure 9:
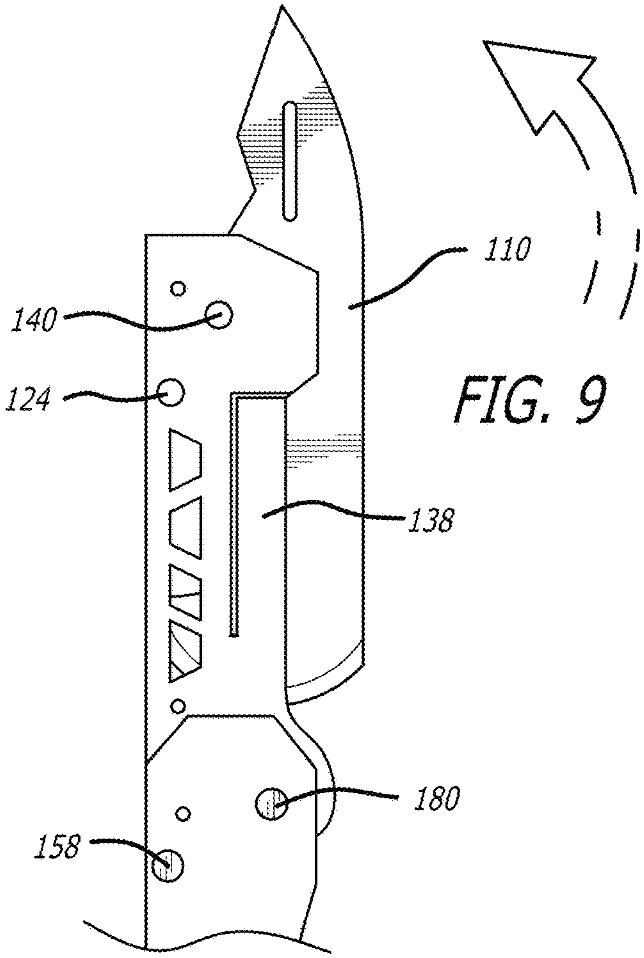
FIGS. 9-10 illustrate back views of an unfolding of the folded head of the multi-folding axe of FIG. 6, leaving the multi-folding axe with an unfolded head.
Figure 10:
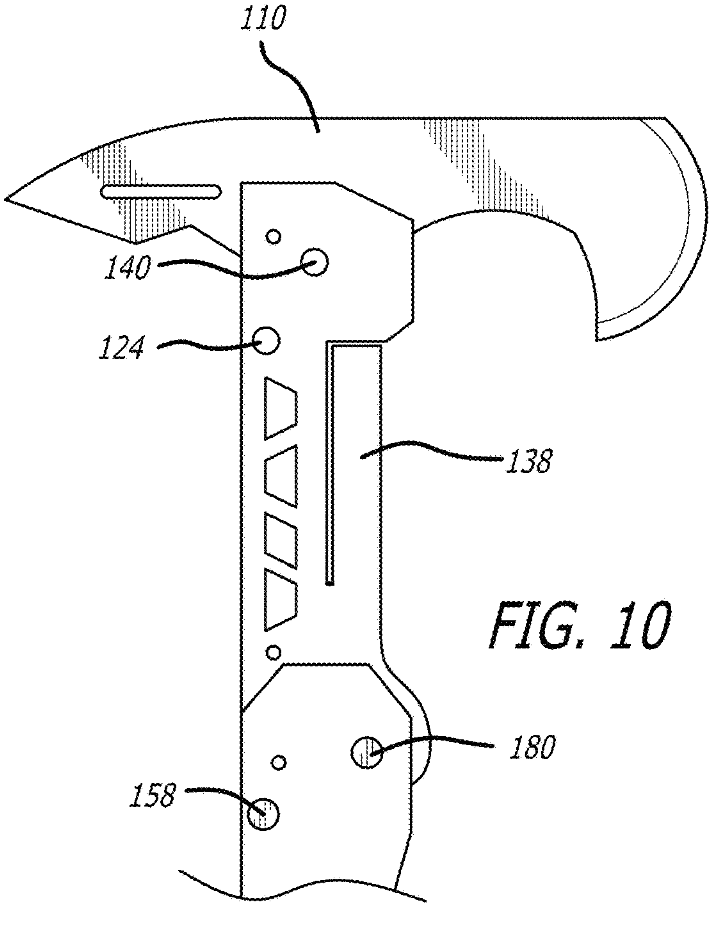
Figure 11:
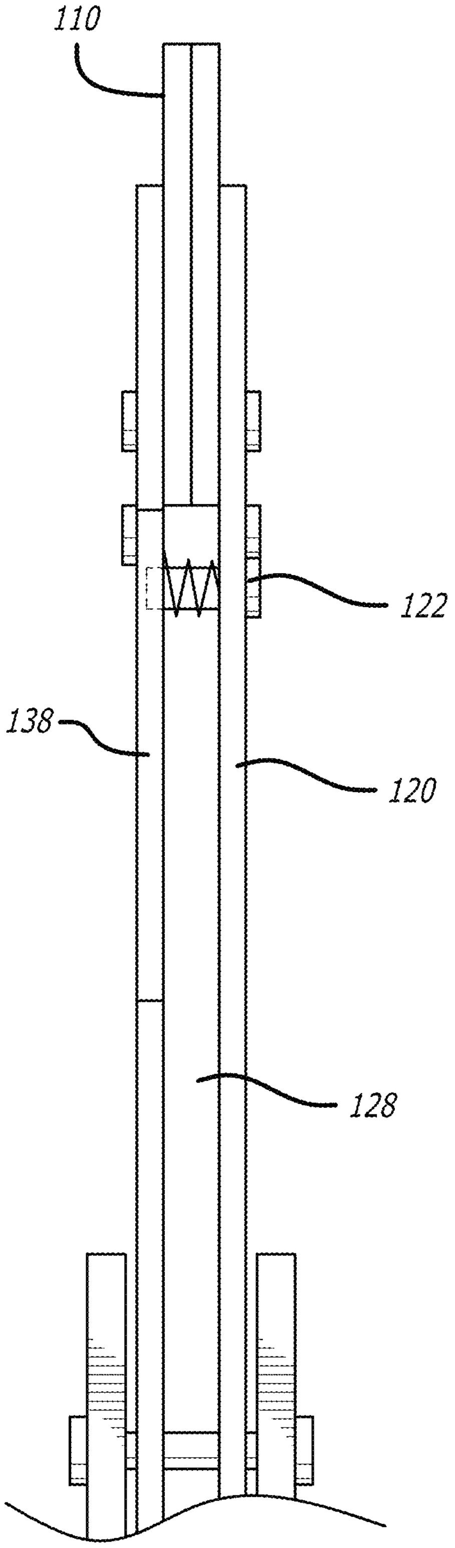
FIGS. 11-12 illustrate left side views of an operation of an automatic catch mechanism to secure the unfolded head of FIG. 10.
Figure 12:
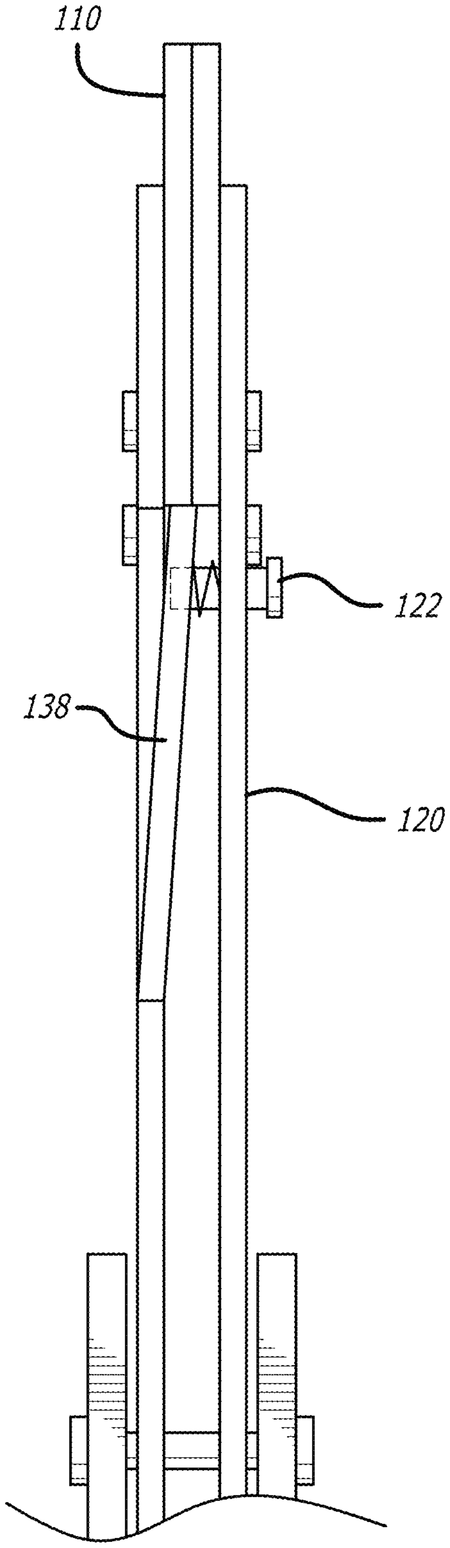

For ease of description, unless otherwise specified or apparent, the width dimension extends left and right, and the length dimension extends up and down, with respect to the axe 100 as oriented in front (or back) views such as FIGS. 2, 6, and 13. In addition, the thickness dimension extends in and out of FIGS. 2, 6, and 13, or left and right with respect to the axe 100 as oriented in (left) side views such as FIG. 3. The length, width, and thickness dimensions are mutually orthogonal. Throughout the disclosure, rotation is intended to be in the length and width dimensions about axes of rotation in the thickness dimension. In addition, in some embodiments, the blade 112 is intended to extend in both the length and width dimensions, from the toe 106 to the heel 108, with the thickness of the blade 112 tapering to its edge. Further, the term "substantially" and "approximately" are used at times to mean within some small amount, such as 5% or 5° depending on context, as would be apparent to one of ordinary skill.

With reference to FIGS. 1-15, in an embodiment, the three main components of the axe 100 are the head 110, the extension 120, and the base 150. The head 110 includes a blade 112 on one end and a butt 114 on an opposite end in the width dimension when (the axe 100 is) unfolded. The head 110 is rotatable about a first axis (corresponding to the first pivot 140) between the blade 112 and the butt 114 when transitioning between folded and unfolded. The first axis is in the thickness dimension. The head 110 has a height (in the length dimension) that contributes to the overall length of the axe 100 when unfolded. Surrounding the first axis is an eye 102, corresponding to the region of the head 110 that interfaces with or overlaps the handle or, more specifically, the extension 120.

The extension 120 includes a shoulder 130, a bottom 132, and a first channel 128. The shoulder 130 is attached to the head 110 at the first axis and interfaces with or overlaps the head 110 at the eye 102. The bottom 132 is opposite the shoulder 130 in the length dimension when unfolded. The bottom 132 is rotatable about a second axis (corresponding to the second pivot 180) at the bottom 132 when transitioning between the folded and unfolded states. The bottom 132 interfaces with or overlaps the base 150. The second axis is in the thickness dimension and parallel to the first axis. The first channel 128 is between the shoulder 130 and the bottom 132. The first channel 128 sheathes a portion of the blade 112 in the folded state.

The base 150 includes a top 170, a knob 160, and a second channel 166. The top 170 is attached to the extension 120 at the second axis. The top 170 interfaces with or overlaps the extension 120 at the bottom 132. The knob 160 is opposite the top 170 in the length dimension when unfolded. The second channel 166 is between the top 170 and the knob 160. The second channel 166 sheathes a remainder of the blade 112 (i.e., the portion of the blade 112 not sheathed by the first channel 128), a portion of the first channel 128, and at least some of the butt 114 when (the axe 100 is) folded.

When unfolded, the head 110 is fixedly attached and perpendicular to the extension 120 at the first axis. That is, the head 110 does not move relative to the extension 120 when the axe 100 is unfolded. In addition, the base 150 is fixedly attached to and in line with and extending away from the extension 120 at the second axis. That is, the base 150 and extension 120 together function as a single handle for the axe 100 and whose length is almost that of the combined lengths of the base 150 and the extension 120 when the axe 100 is unfolded. The length of the axe 100 when unfolded includes this combined length of the handle along with the height of the head 110.

By contrast, when folded, the head 110 is also fixedly attached to the extension 120 at the first axis, only the head 110 is arranged in the length dimension from the blade 112 to the butt 114 (versus the width dimension when unfolded). Further, the butt 114 is substantially sheathed (such as 95% or what someone of ordinary skill would consider "substantially sheathed") by the second channel 166. The extension 120 is also fixedly attached to the base 150 at the second axis, only the extension 120 extends in the opposite direction compared to when the axe 100 is unfolded. That is, the folded extension 120 is parallel to and partially overlaps the base 150 in the length dimension, with the blade 112 sheathed and secured (i.e., unable to move relative to the extension 120 and the base 150) therebetween. The length of the of the axe 100 when folded is the length of the base 150, with the length of the folded head 110 and the length of the folded extension 120 overlapping that of the base 150.

The axe 100 folds in two steps: (1) folding the head 110 into the extension 120, and (2) folding the extension 120 (and folded head 110) into the base 150. Folding the head 110 into the extension 120 includes rotating the head 110 approximately 90° in a first direction (e.g., counterclockwise in FIG. 13) about the first axis with respect to the extension 120. By "approximately" it is meant within a certain amount, such as 5° or what would be apparent to one of ordinary skill. This sheathes a portion of the blade 112 in the first channel 128. Folding the extension 120 and folded head 110 into the base 150 includes rotating the extension 120 and folded head 110 approximately 180° in the first direction (i.e., same direction as the first folding, such as counterclockwise) about the second axis with respect to the base 150. This sheathes the remainder of the blade 112 in the second channel 166, along with a portion of the first channel 128 and at least some of the butt 114.

Likewise, the folded axe 100 unfolds in two steps: (1) unfolding the extension 120 and folded head 110 from the base 150, and (2) unfolding the head 110 from the extension 120. Unfolding the extension 120 and folded head 110 from the base 150 includes rotating the extension 120 and folded head 110 the approximately 180° in a second direction opposite the first direction (e.g., clockwise in FIG. 13) about the second axis with respect to the base. This unsheathes the remainder of the blade 112, the portion of the first channel 128, and the at least some of the butt 114 from the second channel 166. Unfolding the head 110 from the extension 120 includes rotating the head 110 the approximately 90° in the second direction (i.e., same direction as the first unfolding, such as clockwise) about the first axis with respect to the extension 120. This unsheathes the portion of the blade 112 from the first channel 128.

In further detail, the extension 120 extends the base 150 to the head 110 at the eye 102. The eye 102 of the head 110 corresponds to the shoulder 130 (or top, see FIG. 6) of the extension 120, and represents the region of the unfolded axe 100 where the head 110 overlaps the extension 120 (especially the first pivot 140) in the thickness dimension. To this end, in some embodiments, the eye 102 is shaped to be completely overlapped by the shoulder 130 in the folded and unfolded positions.

When open, the head 110 is secured and substantially perpendicular to the extension 120 at the first pivot 140 while the base 150 is secured to and substantially in line with and extending away from the extension 120 at the second pivot 180 to the knob 160 (that corresponds to the bottom of the base 150). Here, "substantially" means within a few degrees (such as five degrees) as would be apparent to one of ordinary skill. In operation, the axe 100 folds at the first pivot 140 and the second pivot 180. In more detail, the head 110 and blade 112 fold about the first pivot 140 into the extension 120 while the extension 120 (and folded head 110) in turn fold about the second pivot 180 into the base 150. When folded, the head 110 is secured to, and the blade 112 is sheathed by, the extension 120 and the base 150. In some embodiments, the entire head 110 is sheathed by the extension 120 and the base 150 when folded.

The head 110 has a (normally curved) blade 112 on one side and a butt 114 on the opposite side (in the width dimension). The blade 112 performs best when it is large and sharp, so caution should be observed when handling the unfolded axe 100. The blade 112 extends from the toe 106 to the heel 108. The blade 112 has a height measured in the length dimension. In addition, the head 110 performs best when it is heavy or dense relative to the rest of the axe 100 (to increase its striking force when the attached extension 120 and base 150 are used as a lever). As such, the head 110 should be made of a heavy durable hard material (such as steel) to maximize weight and cutting force while being able to take a sharp edge for the blade 112.

The butt 114 serves in part as a counterweight to the blade side of the head 110. The butt 114 can vary with embodiment. In some embodiments, the butt 114 is a flat or blunt edge, such as for tapping with a mallet to assist the blade 112 in cutting or splitting. In some embodiments, the butt 114 includes a tool that complements the blade 112, such as a pick, a chisel, a spike, or a smaller blade, to name a few. For example, in FIG. 13, the head 110 has a spike 118 (or pick or chisel). To this extent, like the blade 112 on the other side of the head 110, any sharp or dangerous feature of the butt 114 is configured to fold into and be sheathed by the base 150 when the extension 120 and folded head 110 are folded into the base 150. In some embodiments, the entire butt 114 is configured to be sheathed by the base 150 when folded. In addition, in some embodiments, the butt 114 includes a groove 116 on one or both sides of the head 110 to grasp the head 110 more safely and rotate the head 110 about the first pivot 140 with respect to the extension 120. In some such embodiments, the groove 116 is an opening in the head 110.

The first pivot 140 is located at the eye 102 (of the head 110) and the shoulder 130 (of the extension 120), and provides for free rotation of the head 110 about the first pivot 140 with respect to the extension 120. To this extent, the first pivot 140 defines a first axis of rotation extending in the thickness dimension about which the head 110 rotates relative to (or with respect to) the extension 120. In some embodiments, the first pivot 140 is implemented as a bearing (such as a plain bearing or ball bearing) to allow the head 110 to freely rotate with respect to the extension 120.

The extension 120 extends the base 150 to the head 110 in the unfolded state and provides for the multi-folding capability of the axe 100. To this end, the extension 120 is a fixed piece with two rotatable connections, namely the first pivot 140 and the second pivot 180. The first pivot 140 is at the top (or shoulder 130) of the extension 120 to rotatably connect the extension 120 to the head 110 at the eye 102. In conjunction with the eye 102, the shoulder 130 is shaped (such as mostly hollow in the thickness dimension) to allow the head 110 to freely rotate about the first pivot 140, at least in the folding region (the approximately 90° between the open and closed configurations of the head 110 with respect to the extension 120). Here, "approximately 90°" is intended to mean how one of ordinary skill would interpret such a term, such as between 85° and 95°.

By contrast, the second pivot 180 is at the bottom 132 (see FIG. 6) of the extension 120 to rotatably connect the bottom 132 (of the extension 120) to the top 170 (see FIG. 6) of the base 150. The bottom 132 of the extension 120 corresponds to the top 170 of the base 150 and represents the region of the unfolded axe 100 where the extension 120 overlaps the base 150 (in particular, the second pivot 180) in the thickness dimension. To this end, in some embodiments, the bottom 132 of the extension 120 is shaped to be completely overlapped by the top 170 of the base 150 in the folded and unfolded positions. When open, the extension 120 is secured to and substantially in line with and extending away from the base 150 at the second pivot 180. In some embodiments, the second pivot 180 is implemented as a bearing (such as a plain bearing or ball bearing) to allow the extension 120 to freely rotate with respect to the base 150. Here, the second pivot 180 defines a second axis of rotation in the thickness dimension and parallel to the first axis of rotation associated with the first pivot 140.

The extension 120 includes a first channel 128 (see FIG. 11) of sufficient size to sheathe a portion (such as half, including the heel 108) of the blade 112 when folded into the extension 120. For instance, in some embodiments, the width of the first channel 128 (in the thickness dimension) is larger than the thickness of the blade 112 or head 110. In addition, the depth of the first channel 128 (in the width dimension) is larger than the height of the portion (e.g., half) of the blade 112 that folds into the extension 120. Further, in some embodiments, the length of the first channel 128 (in the length dimension) is larger than the length (in the width dimension) of the blade side of the head 110. This allows the portion of the blade side of the head 110 (including the heel 108) to fold into the first channel 128.

See FIG. 6 for an illustration of the axe 100 in this partially folded state, with the head 110 and blade 112 folded partway into the extension 120 (in particular, the first channel 128), but the extension 120 is still unfolded with respect to the base 150. In this partially folded state, the butt 114 is still fully exposed, along with any tool (such as spike 118) associated with the butt 114.

The extension 120 should be of sufficient size to contain the first channel 128 and sufficient strength to maintain its shape throughout extensive use of the axe 100. Further, the size and weight of the extension 120 should be as small as possible within these constraints to allow the extension 120 (and the folded head 110) to fold into the base 150 as well as to allow the base 150 and extension 120 to deliver as much momentum as possible to the head 110 when using the base 150 and extension 120 as a lever to operate the axe 100.

Figure 14:
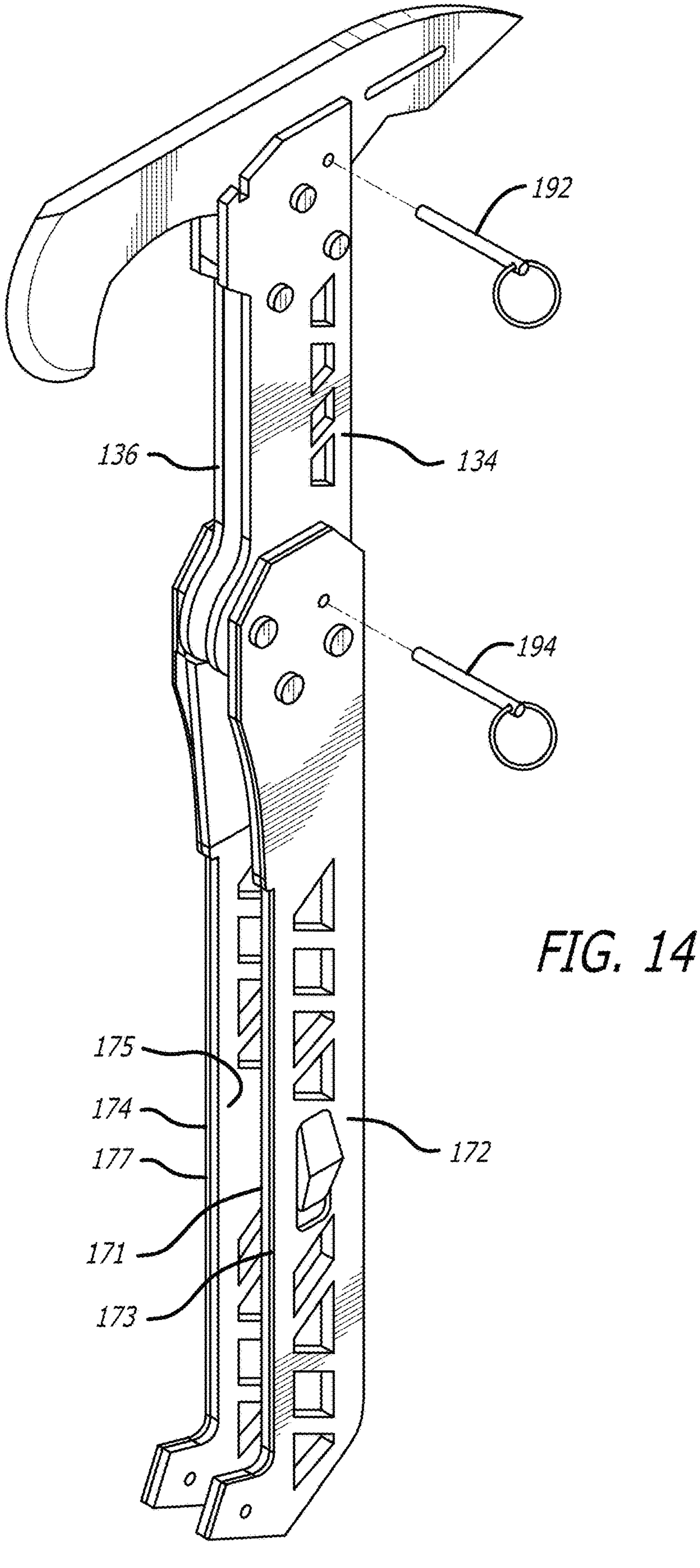
FIGS. 14-15 illustrate oblique views of operations of further securing mechanisms of the unfolded head and the unfolded handle of the multi-folding axe of FIG. 13.
Figure 15:
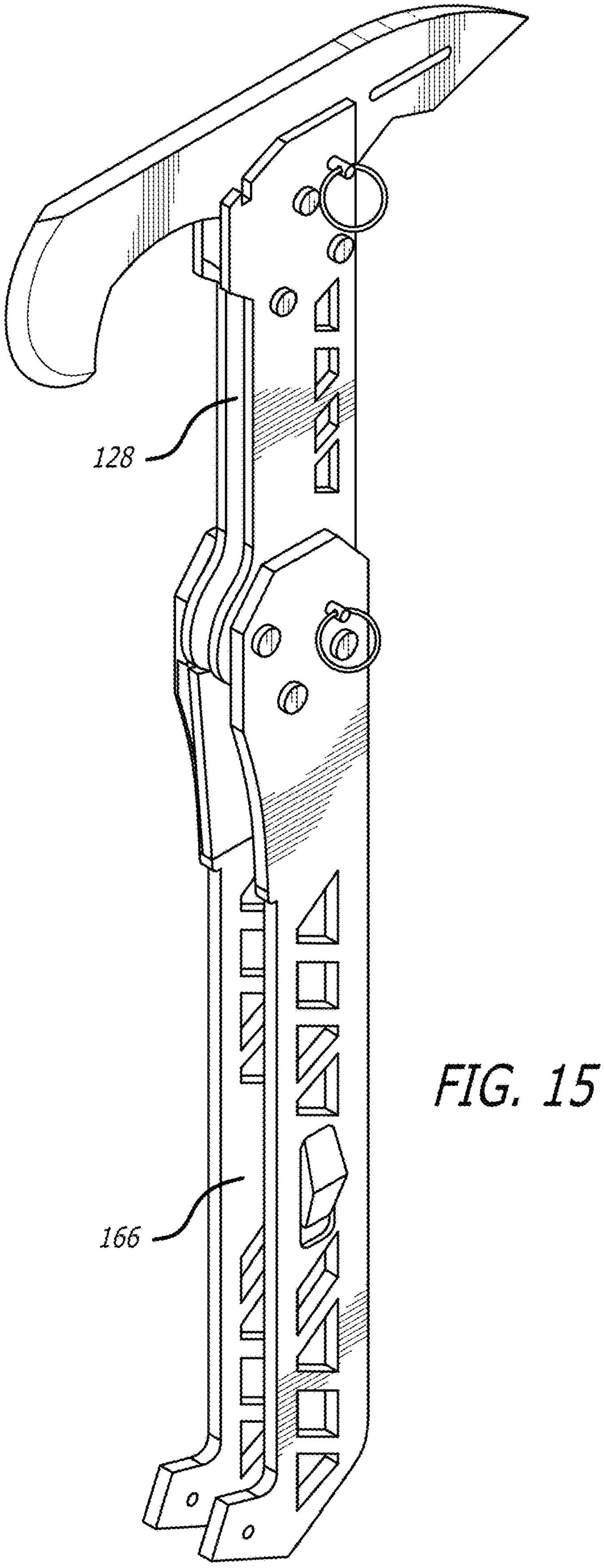

In some embodiments, these goals are accomplished by fabricating the extension 120 out of two parallel plates (e.g., metal plates, such as steel or titanium) of similar, symmetric, or identical shape, such as first plate 134 and second plate 136 (see FIG. 14). The insides of the first and second plates 134 and 136 define the first channel 128. To this end, separators, such as blocks, bolts, bushings, or other spacers (e.g., threaded, welded) are used to attach the first plate 134 to the second plate 136 while also maintaining a uniform width for the first channel 128 between the first and second plates 134 and 136. To this end, the width should not be so large that the first channel 128 exposes the sheathed portion of the blade 112 to accidental encounters through normal handling. In some embodiments, the first and second plates 134 and 136 include symmetric patterns of first openings 126 to create through-holes or passthroughs in the extension 120, reduce the weight of the extension 120, and improve handling of the extension 120. To this end, the first openings 126 should not be so large that they expose the sheathed portion of the blade 112 to accidental encounters through normal handling.

For the axe 100 to function as intended, the blade 112 and head 110 should be fixed (e.g., perpendicular) relative to the extension 120 when unfolded. In some embodiments, this is achieved using a first catch 138 (such as a spring-activated catch or pawl, see FIG. 12) in the extension 120 that automatically engages the head 110 (or more specifically, the eye 102) to stop any rotation of the head 110 relative to the extension 120 about the first pivot 140 when the axe 100 is unfolded. In some such embodiments, the first catch 138 is a first leaf spring that acts as a pawl.

In further detail, the first leaf spring is kept under tension by the eye 102 when folded or partially folded, but acts as a pawl by releasing the tension and engaging and locking the head 110 relative to the extension 120 when the head 110 is unfolded to the open position. In some such embodiments, a first release 122 (such as a spring-assisted release, see FIG. 12) is also provided in the extension 120. The spring in the first release 122 works by compression to keep the first release 122 pressed against the first leaf spring. However, this compression is insufficient to disengage the first leaf spring or restore its tension. Instead, by pressing the first release 122 inward (toward the extension 120), the first release 122 applies pressure to the first leaf spring, which disengages it from the locked head 110 and restores its tension. This allows the head 110 to freely rotate about the first axis of rotation with respect to the extension 120, which also in turn allows the eye 102 to keep the first leaf spring under tension while folded or in the process of folding or unfolding.

To further secure the head 110 relative to the extension 120 in the open position, in some embodiments, a first stop 124 is provided in the extension 120. The first stop 124 stops the head 110 from further rotation in the unfolding direction (clockwise in FIG. 13) once the head 110 reaches the open position. In some embodiments, the first stop 124 is a spacer, bolt, block, bushing, or the like that separates or attaches the first and second plates 134 and 136. The eye 102 is configured (such as shaped) to engage the first stop 124 when rotating clockwise (unfolding) about the first pivot 140. In some such embodiments, the first stop 124 also stops the head 110 from further rotation in the folding direction (counterclockwise in FIG. 13) once the head 110 reaches the closed position in the extension 120. To this end, the eye 102 is further configured (such as shaped) to engage the first stop 124 when rotating counterclockwise (folding) about the first pivot 140.

To further secure the head 110 relative to the extension 120 in the open position, in some embodiments, holes are provided through the extension 120 (see first hole 142) and the eye 102. These holes align when the head 110 is in the open position to create a through-hole. A first pin 192 (such as a detent pin or quick-release pin, see FIGS. 14-15) or cotter of suitable length and diameter or cross section is inserted through the through-hole to secure the head 110 relative to the extension 120 and prevent any rotation of the head 110 relative to the extension 120 about the first pivot 140. In some such embodiments, further such holes, such as third hole 144, are provided in the extension 120, but are located in an area of the extension 120 that is always exposed and never overlaps with the head 110 or base 150 during or after folding or unfolding. These further holes are useful for storing the first pin 192 when the first pin 192 is not actively being used to further secure the head 110 relative to the extension 120 in the open position.

The base 150 is a fixed piece whose top 170 overlaps with the bottom 132 of the extension 120 in the thickness direction at the second pivot 180. In conjunction with the bottom 132, the top 170 is shaped (such as mostly hollow in the thickness dimension) to allow the extension 120 to freely rotate about the second pivot 180, at least in the folding region (the approximately 180° between the open and closed configurations of the extension 120 with respect to the base 150). Here, "approximately 180°" is intended to mean how one of ordinary skill would interpret such a term, such as between 175° and 185°.

The base 150 includes a second channel 166 (see FIG. 15) of sufficient size to sheathe a remainder (such as half, including the toe 106) of the blade 112 as well as some or all (or substantially all, such as 95% or whatever one of ordinary skill would interpret as "substantially all") of the butt 114 when the extension 120 and folded head 110 are folded into the base 150.

For instance, in some embodiments, the width of the second channel 166 (in the thickness dimension) is larger than the thickness of the extension 120 and unsheathed portion of the folded head 110. In addition, the depth of the second channel 166 (in the width dimension) is larger than the height of the remaining portion (e.g., half, including the toe 106) of the blade 112 that remains exposed after the first portion of the blade 112 is folded into the extension 120 (see FIG. 6). Further, the length of the second channel 166 (in the length dimension) is larger than the length of the extension 120 and the exposed butt 114 after the head 110 is folded into the extension 120. This allows the remaining portion of the blade side of the head 110 (including the toe 106) as well as some or all (or substantially all) of the butt 114 to fold into the second channel 166 when the extension 120 and folded head 110 are folded into the base 150.

See FIGS. 1-2 for illustrations of the axe 100 in fully folded states, with the extension 120 and folded head 110 (including the blade 112) folded into the base 150. In addition, most of the butt 114 (including the spike 118) is sheathed by the second channel 166. In some embodiments, all (or substantially all) of the butt 114 is sheathed by the second channel 166 when the extension 120 and folded head 110 are folded into the base 150.

The base 150 should be of sufficient size to contain the second channel 166 and sufficient strength to maintain its shape throughout extensive use of the axe 100. Further, the base 150 should be long enough to allow hand holding near the knob 160 for both unfolded and folded states (e.g., fingers of intended users are able to reach around and grip the base 150 near the knob 160 for a secure grip and without significant interference from the folded extension 120 or butt 114). To this end, in some embodiments, the knob 160 includes a hook 162 or hook shape to better or more securely grip the axe 100 by the base 150 when in use as well as to hang the axe 100 upside down when not in use. A longer base 150 improves leverage delivered to the head 110 when using the axe 100, but compromises compactness of the axe 100 when folded as well as overall weight of the axe 100.

In light of these considerations, in some embodiments, the base 150 (like the extension 120) is fabricated out of two parallel plates (e.g., metal plates, such as steel or titanium) of similar or identical shape, such as third plate 172 and fourth plate 174 (see FIG. 14). The insides of the third and fourth plates 172 and 174 define the second channel 166. To this end, separators, such as blocks, bolts, bushings, or other spacers (e.g., threaded, welded) are used to attach the third plate 172 to the fourth plate 174 while also maintaining a uniform width for the second channel 166 between the third and fourth plates 172 and 174. Since the width of the second channel 166 is significantly larger than that of the first channel 128, adequate measures should be taken to minimize accidental encounters through normal handling with the remaining portion of the blade 112 that is sheathed in the second channel 166. For example, stops (such as second stop 154) can help prevent inadvertent access to the second channel 166 near the location of the sheathed blade 112.

In some embodiments, the third and fourth plates 172 and 174 include symmetric patterns of second openings 164 to create through-holes or passthroughs in the base 150, reduce the weight of the base 150, and improve handling of the base 150. To this end, the second openings 164 should not be so large that they expose the sheathed portion of the blade 112 to accidental encounters through normal handling. As an alternative, in some such embodiments (see FIG. 13), the second openings 164 in the third and fourth plates 172 and 174 are larger than the first openings 126 in the first and second plates 134 and 136, but the second openings 164 are not present in the areas of the third and fourth plates 172 and 174 corresponding to the sheathed blade 112.

In some embodiments, a symmetric or corresponding set of grips are attached (e.g., screwed, glued, or otherwise fastened) to the outsides of the third and fourth plates 172 and 174. The grips are made of a thin durable material, such as hard plastic or rubber, to help protect the axe 100, improve handling of the axe 100 by the base 150, and reduce the amount of exposed metal (especially in the folded state) while not adding significant size or weight to the base 150. The grips also have similar arrangements of any openings of the third and fourth plates 172 and 174, to maintain any functionality that such openings afforded the third and fourth plates 172 and 174 (e.g., through-holes in the base 150 formed by symmetric openings in the third and fourth plates 172 and 174 continue to function as through-holes with the grips attached to the outsides of the third and fourth plates 172 and 174). In some such embodiments, the grips have a textured outer surface to further improve handling of the axe 100 by the base 150. In some further embodiments, the grips effectively add a second layer to the outsides of the third and fourth plates 172 and 174, creating multi-layered third and fourth plates 172 and 174, such as first grip layer (first grip) 173 (see FIG. 14) and first plate layer 171 (for third plate 172) and second grip layer (second grip) 177 and second plate layer 175 (for fourth plate 174).

For the axe 100 to function as intended, the extension 120 should be fixed (e.g., in line and extending away) relative to the base 150 when unfolded. In some embodiments, this is achieved using a second catch 176 (such as a spring-activated catch or pawl, see FIG. 8) in the base 150 that automatically engages the extension 120 (or more specifically, the bottom 132) to stop any rotation of the extension 120 relative to the base 150 about the second pivot 180 when the axe 100 is unfolded. In some such embodiments, the second catch 176 is a second leaf spring that acts as a pawl.

In further detail, the second leaf spring is kept under tension by the bottom 132 when folded or partially folded, but acts as a pawl by releasing the tension and engaging and locking the extension 120 relative to the base 150 when the extension 120 is unfolded to the open position. In some such embodiments, a second release 152 (such as a spring-assisted release, see FIG. 8) is also provided in the base 150. The spring in the second release 152 works by compression to keep the second release 152 pressed against the second leaf spring. However, this compression is insufficient to disengage the second leaf spring or restore its tension. Instead, by pressing the second release 152 inward (toward the base 150), the second release 152 applies pressure to the second leaf spring, which disengages it from the locked extension 120 and restores its tension. This allows the extension 120 to freely rotate about the second axis of rotation with respect to the base 150, which also in turn allows the bottom 132 to keep the second leaf spring under tension while folded or in the process of folding or unfolding.

To further secure the extension 120 relative to the base 150 in the open position, in some embodiments, a third stop 158 is provided in the base 150. The third stop 158 stops the extension 120 from further rotation in the unfolding direction (clockwise in FIG. 6) once the extension 120 reaches the open position. In some embodiments, the third stop 158 is a spacer, bolt, block, bushing, or the like that separates or attaches the first and second plates 134 and 136. The bottom 132 is configured (such as shaped) to engage the third stop 158 when rotating clockwise (unfolding) about the second pivot 180.

To still further secure the extension 120 relative to the base 150 in the open position, in some embodiments, holes are provided through the base 150 (such as second hole 182) and the bottom 132 (such as fifth hole 186, see FIGS. 1-2). These holes align when the extension 120 is in the open position to create a through-hole. A second pin 194 (such as a detent pin or quick-release pin, see FIGS. 14-15) or cotter of suitable length and diameter or cross section is inserted through the through-hole to secure the extension 120 relative to the base 150 and prevent any rotation of the extension 120 relative to the base 150 about the second pivot 180. In some such embodiments, further such holes, such as fourth hole 184, are provided in the base 150, but are located in an area of the base 150 that is always exposed and never overlaps with the extension 120 or head 110 during or after folding or unfolding. These further holes are useful for storing the second pin 194 when the second pin 194 is not actively being used to secure the extension 120 relative to the base 150 in the open position.

Figure 3:
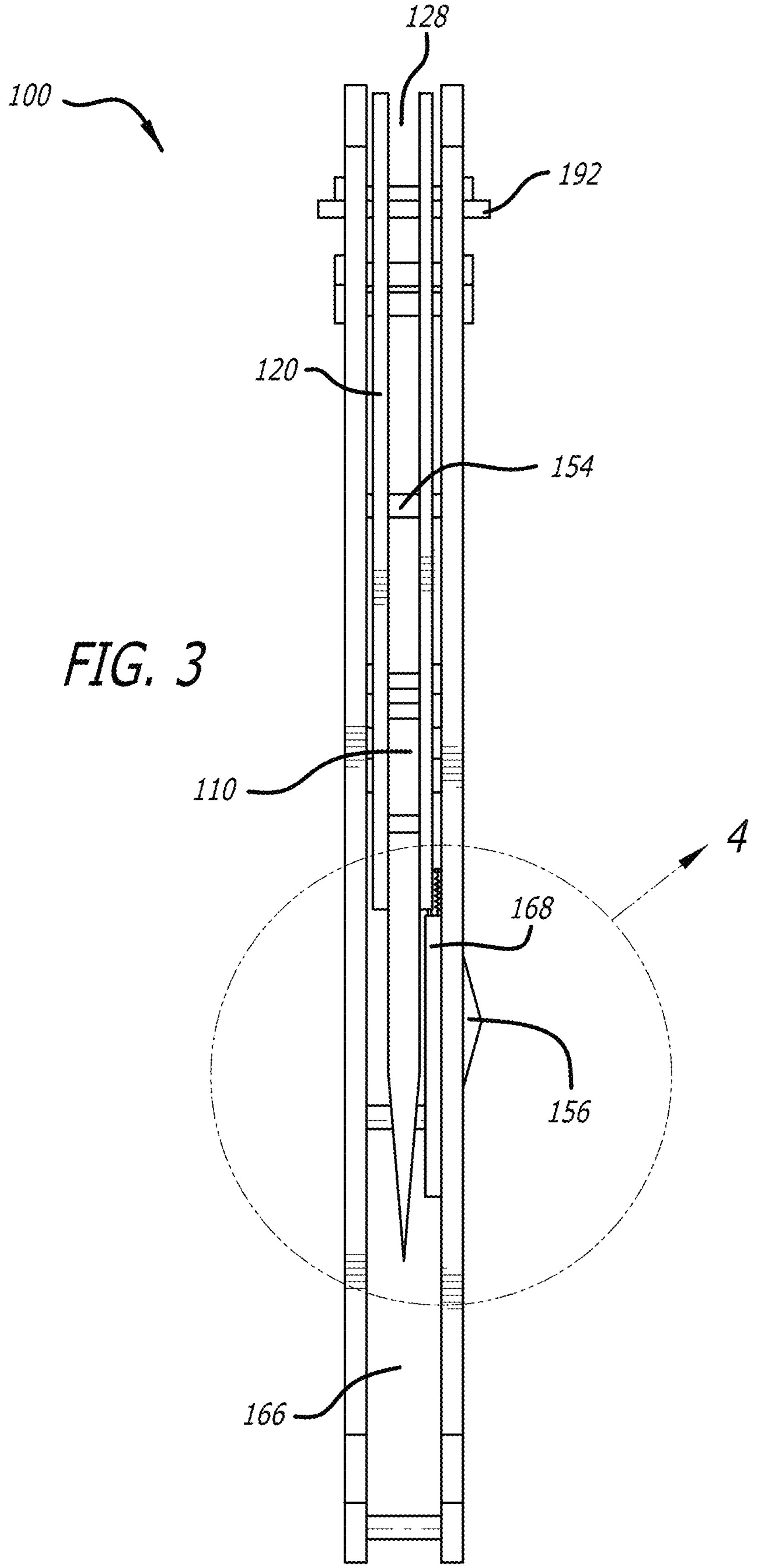
FIG. 3 illustrates a left side view of the multi-folding axe of FIG. 2.
Figure 4:
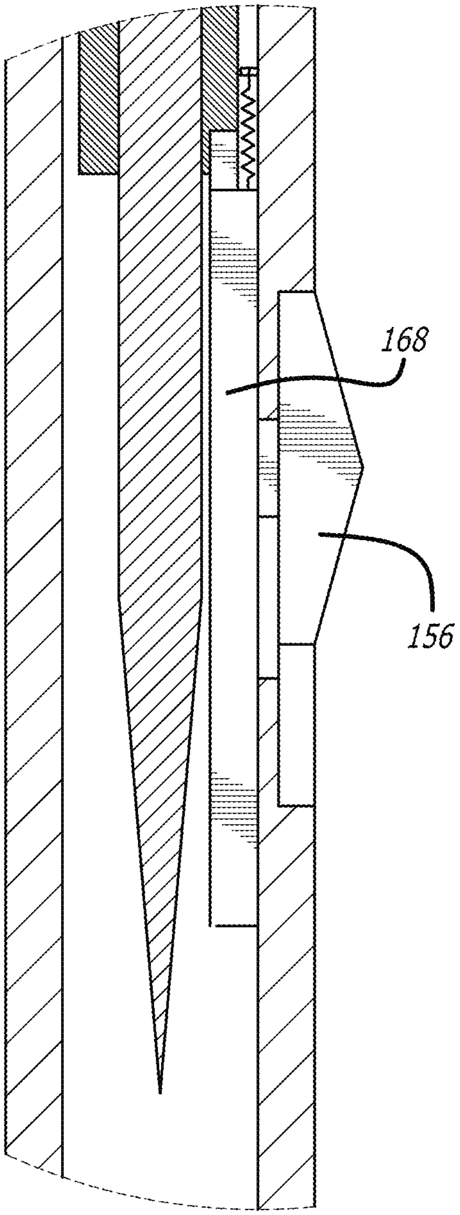
FIGS. 4-5 illustrate an operation of a catch-releasing mechanism of region 4 of the multi-folding axe of FIG. 3, to allow the folded handle to unfold.
Figure 5:
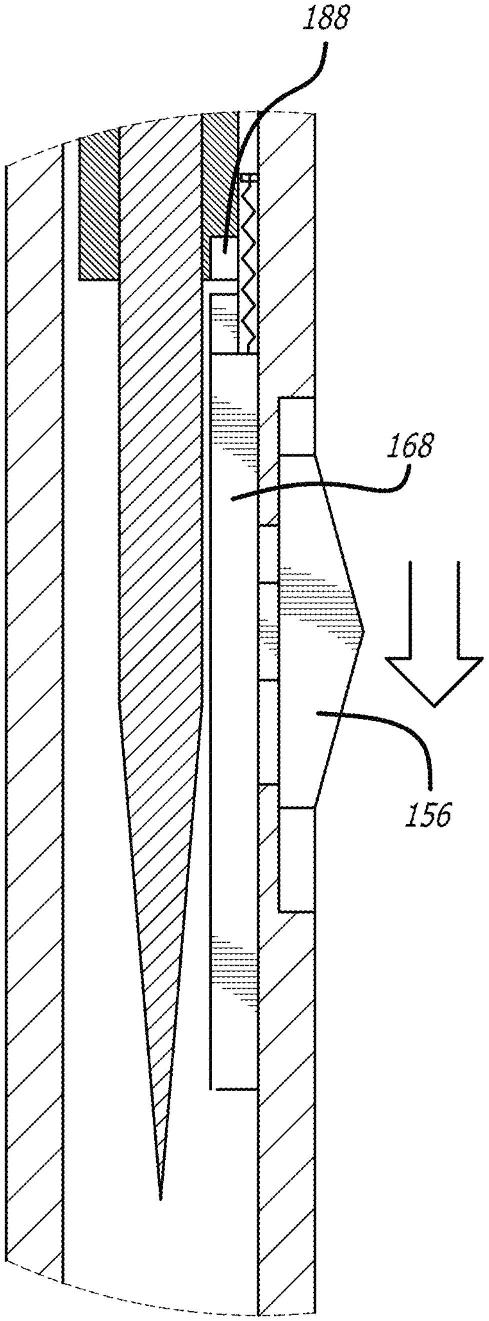

To better secure the axe 100 when folded, such as to prevent the axe 100 from unintentionally opening or prevent any unintended rotation about the first pivot 140 or the second pivot 180 between their respective components, in some embodiments, the base 150 includes a third catch 168 (such as a spring-activated catch or pawl, see FIG. 3 as well as FIGS. 4-5 for further detail). The third catch 168 automatically engages the extension 120, such as in the shoulder 130 (see notch 188, in FIG. 6), to stop any rotation of the extension 120 relative to the base 150 about the second pivot 180 when the axe 100 is folded. In some such embodiments, the third catch 168 uses a slidable bar and a tension spring that allows the slidable bar to act as a pawl by automatically engaging the notch 188 when the extension 120 is folded into the base 150.

In some such embodiments, the base 150 includes a third release 156 that is directly connected to the slidable bar and, by extension, the tension spring. As shown in FIGS. 4-5, sliding the third release 156 down causes a similar sliding of the third catch 168, which disengages the third catch 168 from the notch 188 and unlocks the folded extension 120 from the base 150. This allows the extension 120 to be unfolded from the base 150. Letting go of the third release 156 allows the tension in the tension spring to return the third release 156 to its (normal) up position.

One or more of the components illustrated in FIGS. 1-15 can be rearranged or combined into a single component or several different components that accomplish the same functionality without departing from the scope of the disclosure, as would be apparent to one of ordinary skill. For example, the plates and fasteners used to fabricate the extension 120 and the base 150 in some embodiments can be replaced with single cast metal pieces for each in some other embodiments. Additional components can also be added without departing from the scope of the disclosure, as would be apparent to one of ordinary skill. Materials can be varied from example materials used to describe some of the embodiments where they can provide similar functionality without departing from the scope of the disclosure, as would be apparent to one of ordinary skill.

The various features of the disclosure described herein can be implemented in different systems without departing from the scope of the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A folding axe comprising:

a head having an exposed blade and an exposed butt opposite the exposed blade in a width dimension when unfolded, and rotatable about a first axis between the exposed blade and the exposed butt when transitioning between folded and unfolded, the first axis being in a thickness dimension;

an extension having a shoulder attached to the head at the first axis, a bottom opposite the shoulder in a length dimension when unfolded, and rotatable about a second axis at the bottom when transitioning between folded and unfolded, the second axis being in the thickness dimension and parallel to the first axis, and a first channel between the shoulder and the bottom, to sheathe a portion of the exposed blade when folded while still leaving the exposed butt fully exposed; and a base having a top attached to the extension at the second axis, a knob opposite the top in the length dimension when unfolded, and a second channel between the top and the knob, to sheathe a remainder of the exposed blade, a portion of the first channel, and at least some of the exposed butt when folded.

2. The folding axe of claim 1, wherein:

when unfolded, the head is fixedly attached and perpendicular to the extension at the first axis, and the base is fixedly attached to and in line with and extending away from the extension at the second axis; and when folded, the head is fixedly attached to the extension at the first axis, the exposed butt is substantially sheathed by the second channel, and the extension is fixedly attached to the base at the second axis.

3. The folding axe of claim 1, wherein the axe folds by:

folding the head into the extension by rotating the head approximately 90° in a first direction about the first axis with respect to the extension to sheathe the portion of the exposed blade in the first channel while still leaving the exposed butt fully exposed; and folding the extension and the folded head into the base by rotating the extension and the folded head approximately 180° in the first direction about the second axis with respect to the base to sheathe the remainder of the exposed blade, the portion of the first channel, and the at least some of the exposed butt in the second channel.

4. The folding axe of claim 3, wherein:

the extension comprises a first stop to prevent the head from rotating more than the approximately 90° in the first direction about the first axis with respect to the extension when folding the head into the extension; and the base comprises a second stop to secure the folded head to the extension and prevent the extension and the folded head from rotating more than the approximately 180° in the first direction about the second axis with respect to the base when folding the extension and the folded head into the base.

5. The folding axe of claim 3, wherein the base comprises:

a first catch to engage the folded extension and prevent the extension from unfolding from the base by automatically fixedly attaching the folded extension to the base when folding the extension into the base; and a first release to allow the extension to unfold from the base by disengaging the first catch from the folded extension.

6. The folding axe of claim 3, wherein the axe unfolds by:

unfolding the extension and the folded head from the base by rotating the extension and the folded head the approximately 180° in a second direction opposite the first direction about the second axis with respect to the base to unsheathe the remainder of the exposed blade, the portion of the first channel, and the at least some of the exposed butt from the second channel; and unfolding the head from the extension by rotating the head the approximately 90° in the second direction about the first axis with respect to the extension to unsheathe the portion of the exposed blade from the first channel.

7. The folding axe of claim 6, wherein:

the base comprises a third stop to prevent the extension from rotating more than the approximately 180° in the second direction about the second axis with respect to the base when unfolding the extension from the base; and the extension comprises a first stop to stop the head from rotating more than the approximately 90° in the second direction about the first axis with respect to the extension when unfolding the head from the extension.

8. The folding axe of claim 6, wherein:

the base comprises a second catch to engage the unfolded extension and prevent the extension from folding into the base by automatically fixedly attaching the unfolded extension to the base when unfolding the extension from the base, and a second release to allow the extension to fold into the base by disengaging the second catch from the unfolded extension; and the extension comprises a third catch to engage the unfolded head and prevent the head from folding into the extension by automatically fixedly attaching the unfolded head to the extension when unfolding the head from the extension, and a third release to allow the head to fold into the extension by disengaging the third catch from the unfolded head.

9. A folding axe comprising:

a head having a blade and a butt opposite the blade in a width dimension when unfolded, and rotatable about a first axis between the blade and the butt when transitioning between folded and unfolded, the first axis being in a thickness dimension;

an extension having a shoulder attached to the head at the first axis, a bottom opposite the shoulder in a length dimension when unfolded, and rotatable about a second axis at the bottom when transitioning between folded and unfolded, the second axis being in the thickness dimension and parallel to the first axis, and a first channel between the shoulder and the bottom, to sheathe a portion of the blade when folded;

a base having a top attached to the extension at the second axis, a knob opposite the top in the length dimension when unfolded, and a second channel between the top and the knob, to sheathe a remainder of the blade, a portion of the first channel, and at least some of the butt when folded;

a first pin that inserts through corresponding first holes in the head and the extension in the thickness dimension when unfolded to prevent rotation of the head about the first axis with respect to the extension; and a second pin that inserts through corresponding second holes in the extension and the base in the thickness dimension when unfolded to prevent rotation of the extension about the second axis with respect to the base.

10. The folding axe of claim 1, wherein:

the extension comprises a first plate extending in the length and width dimensions when unfolded, and a second plate parallel to and having a same size as the first plate, the first and second plates defining a size and shape of the extension and having insides defining the first channel therebetween; and the base comprises a third plate extending in the length and width dimensions when unfolded, and a fourth plate parallel to and having a same size as the third plate, the third and fourth plates defining a size and shape of the base and having insides defining the second channel therebetween.

11. The folding axe of claim 10, wherein:

the first and second plates are made of metal and have symmetric patterns of first openings to save weight and create first passthroughs in the thickness dimension when unfolded; and the third and fourth plates are made of metal and have symmetric patterns of second openings to save weight and create second passthroughs in the thickness dimension when unfolded.

12. The folding axe of claim 10, wherein:

the base further comprises a first grip fixedly attached to an outside of the third plate and a second grip fixedly attached to an outside of the fourth plate, the first and second grips help protect and facilitate handling of the base.

13. A folding axe comprising:

a head having a blade and a butt opposite the blade in a width dimension when unfolded, and rotatable about a first axis between the blade and the butt when transitioning between folded and unfolded, the first axis being in a thickness dimension;

an extension having a shoulder attached to the head at the first axis, a bottom opposite the shoulder in a length dimension when unfolded, and rotatable about a second axis at the bottom when transitioning between folded and unfolded, the second axis being in the thickness dimension and parallel to the first axis, and a first channel between the shoulder and the bottom, to sheathe a portion of the blade when folded; and a base having a top attached to the extension at the second axis, a knob opposite the top in the length dimension when unfolded, and a second channel between the top and the knob, to sheathe a remainder of the blade, a portion of the first channel, and at least some of the butt when folded, wherein:

the knob comprises a hook shape to secure a hand when holding the axe by the base;

the butt comprises a chisel or pick opposite the blade in the width dimension when unfolded;

the butt is sheathed by the second channel when folded; and the butt further comprises a groove to facilitate rotating the head about the first axis with respect to the extension.

14. A multi-folding axe comprising:

a head having a blade at one end;

an extension rotatably attached to the head at a first axis, and substantially perpendicular to the head with respect to the blade when unfolded; and a base rotatably attached to the extension at a second axis parallel to the first axis, and substantially in line with and extending away from the extension when unfolded, wherein the blade folds into the extension by rotating the head in one direction about the first axis with respect to the extension, wherein the extension and the folded blade fold into the base by rotating the extension and the folded blade in the one direction about the second axis, and wherein the blade is sheathed by and secured to the extension and the base when folded into the extension and the base by:

a catch in the base that prevents the folded extension from rotating about the second axis with respect to the base by automatically engaging the extension when the extension folds into the base;

a first stop in the extension that prevents the folded blade from rotating in the one direction about the first axis with respect to the extension; and a second stop in the base that prevents the folded blade from rotating in an opposite direction about the first axis with respect to the folded extension.

15. The multi-folding axe of claim 14, wherein:

the catch is a third catch;

the extension comprises a first catch that prevents the blade when unfolded from rotating about the first axis with respect to the extension by automatically engaging the head when the blade unfolds from the extension; and the base further comprises a second catch that prevents the extension when unfolded from rotating about the second axis with respect to the base by automatically engaging the extension when the extension unfolds from the base.

16. A multi-folding axe comprising:

a head having a blade at one end;

an extension rotatably attached to the head at a first axis, and substantially perpendicular to the head with respect to the blade when unfolded; and a base rotatably attached to the extension at a second axis parallel to the first axis, and substantially in line with and extending away from the extension when unfolded, wherein the blade folds into the extension by rotating the head in one direction about the first axis with respect to the extension, wherein the extension and the folded blade fold into the base by rotating the extension and the folded blade in the one direction about the second axis, and wherein the blade is sheathed and secured by the extension and the base when folded into the extension and the base, wherein:

the extension comprises a first catch that prevents the blade when unfolded from rotating about the first axis with respect to the extension by automatically engaging the head when the blade unfolds from the extension;

the base comprises a second catch that prevents the extension when unfolded from rotating about the second axis with respect to the base by automatically engaging the extension when the extension unfolds from the base;

the first catch comprises a first leaf spring that releases tension to secure the head with respect to the extension when the blade unfolds from the extension; and the second catch comprises a second leaf spring that releases tension to secure the extension with respect to the base when the extension unfolds from the base.

17. The multi-folding axe of claim 16, wherein:

the extension further comprises a first release that restores the tension in the first leaf spring to allow the blade to fold into the extension; and the base further comprises a second release that restores the tension in the second leaf spring to allow the extension and the folded blade to fold into the base.

18. A multi-folding axe comprising:

a head having a blade at one end;

an extension rotatably attached to the head at a first axis, and substantially perpendicular to the head with respect to the blade when unfolded; and a base rotatably attached to the extension at a second axis parallel to the first axis, and substantially in line with and extending away from the extension when unfolded, wherein the blade folds into the extension by rotating the head in one direction about the first axis with respect to the extension, wherein the extension and the folded blade fold into the base by rotating the extension and the folded blade in the one direction about the second axis, and wherein the blade is sheathed and secured by the extension and the base when folded into the extension and the base, wherein:

the extension comprises a first catch that prevents the blade when unfolded from rotating about the first axis with respect to the extension by automatically engaging the head when the blade unfolds from the extension;

the base comprises a second catch that prevents the extension when unfolded from rotating about the second axis with respect to the base by automatically engaging the extension when the extension unfolds from the base; and the multi-folding axe further comprises:

a first pin that inserts through corresponding first holes in the head and the extension when unfolded to further prevent the unfolded blade from rotating about the first axis with respect to the extension; and a second pin that inserts through corresponding second holes in the extension and the base when unfolded to further prevent the unfolded extension from rotating about the second axis with respect to the base.

19. A multi-folding axe comprising:

a head having a blade at one end;

an extension rotatably attached to the head at a first axis, and substantially perpendicular to the head with respect to the blade when unfolded; and a base rotatably attached to the extension at a second axis parallel to the first axis, and substantially in line with and extending away from the extension when unfolded, wherein the blade folds into the extension by rotating the head in one direction about the first axis with respect to the extension, wherein the extension and the folded blade fold into the base by rotating the extension and the folded blade in the one direction about the second axis, and wherein the blade is sheathed and secured by the extension and the base when folded into the extension and the base, wherein:

the extension comprises a first catch that prevents the blade when unfolded from rotating about the first axis with respect to the extension by automatically engaging the head when the blade unfolds from the extension;

the base comprises a second catch that prevents the extension when unfolded from rotating about the second axis with respect to the base by automatically engaging the extension when the extension unfolds from the base;

the base further comprises a third catch that prevents the folded extension from rotating about the second axis with respect to the base by automatically engaging the extension when the extension folds into the base;

the extension further comprises a first stop that prevents the folded blade from rotating in the one direction about the first axis with respect to the extension; and the base further comprises a second stop that prevents the folded blade from rotating in an opposite direction about the first axis with respect to the folded extension.

20. A foldable axe comprising:

a foldable head having a blade at one end; and a foldable handle having a top section and a bottom section, wherein the top section securely attaches to and in line with the bottom section when unfolded, wherein the head securely attaches to the handle in a perpendicular orientation with respect to the blade when unfolded, wherein when folding the axe, the head folds into the top section via a first pivot that rotatably connects the head to the top section, and the top section and folded head fold into the bottom section via a second pivot that rotatably connects the top section to the bottom section, and wherein the foldable axe further comprises:

a first pin that inserts through corresponding first holes in the head and the handle when unfolded to further securely attach the head to the handle when unfolded; and a second pin that inserts through corresponding second holes in the top and bottom sections when unfolded to further securely attach the top section to the bottom section when unfolded.

* * * * *